(12) United States Patent
Daniels et al.

(10) Patent No.: US 11,040,849 B2
(45) Date of Patent: Jun. 22, 2021

(54) METHOD FOR BLOCKING AND FILTERING FALSE AUTOMATIC ELEVATOR CALLS

(71) Applicant: OTIS ELEVATOR COMPANY, Farmington, CT (US)

(72) Inventors: Harrison Daniels, Avon, CT (US); Bradley Armand Scoville, Farmington, CT (US); Sam Wong, Bridgeport, CT (US); Paul A. Simcik, Southington, CT (US); Stephen Richard Nichols, Plantsville, CT (US); Yew Hung Leong, Bristol, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 639 days.

(21) Appl. No.: 15/907,433

(22) Filed: Feb. 28, 2018

(65) Prior Publication Data

US 2019/0263626 A1     Aug. 29, 2019

(51) Int. Cl.
*B66B 1/34* (2006.01)
*B66B 1/46* (2006.01)
*H04W 4/02* (2018.01)

(52) U.S. Cl.
CPC ............ *B66B 1/468* (2013.01); *B66B 1/3461* (2013.01); *B66B 2201/4638* (2013.01);
(Continued)

(58) Field of Classification Search
CPC ..... H04L 67/10; H04L 63/0236; H04L 41/12; H04W 8/02; H04W 12/12;
(Continued)

(56) References Cited

U.S. PATENT DOCUMENTS

| 3,519,102 A | 7/1970 | Savino |
| 5,832,363 A | 11/1998 | Moriya et al. |

(Continued)

FOREIGN PATENT DOCUMENTS

| CN | 102874662 A | 1/2013 |
| CN | 104803244 A | 7/2015 |

(Continued)

OTHER PUBLICATIONS

"Elevator car call cancellation"; http://elevation.wikia.com/wiki/Elevator_car_call_cancellation; Feb. 26, 2018; pp. 1-8.

(Continued)

*Primary Examiner* — Marlon T Fletcher
(74) *Attorney, Agent, or Firm* — Cantor Colburn LLP

(57) ABSTRACT

According to one embodiment, a computer-implemented method for preventing an unintended call for a conveyance apparatus of a conveyance system is provided. The conveyance system comprising a first location device and a second location device. The computer-implemented method comprising: detecting a first interaction between the mobile device and the first location device; determining a travel direction of the first mobile device; and automatically filtering a second interaction between the mobile device and a second location device to prevent an unintended call to a conveyance apparatus in response to the travel direction of the mobile device.

20 Claims, 3 Drawing Sheets

(52) U.S. Cl.
CPC ............... *B66B 2201/4653* (2013.01); *B66B 2201/4684* (2013.01); *H04W 4/027* (2013.01)

(58) Field of Classification Search
CPC .... B66B 2201/4615; B66B 2201/4653; B66B 2201/4638; B66B 2201/4676; B66B 1/3461; B66B 2201/4669; B66B 1/24; B66B 1/2408; B66B 1/3492; B66B 2201/20; B66B 2201/4684; B66B 3/00; B66B 3/002; B66B 3/006
See application file for complete search history.

(56) References Cited

U.S. PATENT DOCUMENTS

| | | | |
|---|---|---|---|
| 6,109,396 | A | 8/2000 | Sirag et al. |
| 6,161,656 | A | 12/2000 | Horbrugger et al. |
| 6,209,685 | B1 | 4/2001 | Zaharia et al. |
| 6,397,976 | B1 | 6/2002 | Hale et al. |
| 6,615,175 | B1 | 9/2003 | Gazdzinski |
| 7,284,639 | B2 | 10/2007 | Sasaki et al. |
| 8,136,636 | B2 | 3/2012 | Bahjat et al. |
| 8,401,472 | B2 * | 3/2013 | Gerstenkorn ............ B66B 1/468 455/41.2 |
| 9,834,408 | B2 | 12/2017 | Fujiwara |
| 9,856,107 | B2 | 1/2018 | Haipus et al. |
| 2005/0087402 | A1 * | 4/2005 | Haegi ................ B66B 1/2466 187/383 |
| 2013/0048436 | A1 | 2/2013 | Chan |
| 2015/0158694 | A1 * | 6/2015 | Finschi .............. B66B 1/2458 187/247 |
| 2015/0166304 | A1 | 6/2015 | Roberts et al. |
| 2015/0251874 | A1 | 9/2015 | Salmikuukka |
| 2015/0314983 | A1 * | 11/2015 | Saari ................. B66B 1/2458 187/382 |
| 2015/0321881 | A1 * | 11/2015 | Salmikuukka ............ B66B 1/46 187/247 |
| 2016/0122157 | A1 | 5/2016 | Keser |
| 2016/0376124 | A1 * | 12/2016 | Bunter .................. B66B 1/468 187/247 |
| 2017/0297862 | A1 * | 10/2017 | Ifland ................... B66B 1/3461 |
| 2019/0161316 | A1 * | 5/2019 | Nichols ................ B66B 1/2408 |
| 2019/0161317 | A1 * | 5/2019 | Nichols ................ B66B 1/2408 |
| 2019/0168993 | A1 * | 6/2019 | Kuenzi .................. B66B 1/468 |
| 2019/0263626 | A1 * | 8/2019 | Daniels ................ B66B 1/3461 |
| 2019/0389692 | A1 * | 12/2019 | Pahlke ................. B66B 1/2408 |
| 2020/0290842 | A1 * | 9/2020 | Begle ................... B66B 5/0012 |
| 2020/0307952 | A1 * | 10/2020 | Wei ...................... B66B 1/3461 |

FOREIGN PATENT DOCUMENTS

| | | |
|---|---|---|
| CN | 107187968 A | 9/2017 |
| JP | 6072624 B2 | 2/2017 |

OTHER PUBLICATIONS

Garfield, Leanna; "This App Lets you Open Doors and Summon Elevators with your Phone" https://www.businessinsider.in/This-app-lets-you-open-doors-and-summon-elevators-with-your-phone/articleshow/52349050.cms; May 19, 2016; pp. 1-5.

Svensson, Eric; How to Make an App for Remote Controlling an Elevator (Part 1); https://evothings.com/how-to-make-an-app-for-remote-controlling-an-elevator-part-1/; Oct. 9, 2014; pp. 1-2.

The Extended European Search Report for Application No. 19160155.8-1017; dated Jul. 17, 2019; Report Received: Aug. 13, 2019; 7 pages.

First Chinese Office Action for Application No. 201910148359.6; dated Feb. 3, 2021; Report Received Date: Feb. 10, 2021; 8 pages.

* cited by examiner

METHOD FOR BLOCKING AND FILTERING FALSE AUTOMATIC ELEVATOR CALLS

BACKGROUND

The subject matter disclosed herein relates generally to the field of conveyance systems, and specifically to a method and apparatus for calling a conveyance apparatus of a conveyance system.

In present high rise buildings, conventional elevator systems require passengers to take multi-segment trips (e.g., ride multiple elevators) to get to their destination. In turn, the conventional elevator systems of the high rise buildings require the passengers to learn a layout of the high rise buildings (e.g., which elevators serve which floors) to initiate and accomplish these multi-segment trips. Multi-segment trips are challenging and add a level of complication to elevator travel, especially to visitors who are new to a particular high rise building.

BRIEF DESCRIPTION

According to one embodiment, a computer-implemented method for preventing an unintended call for a conveyance apparatus of a conveyance system is provided. The conveyance system comprising a first location device and a second location device. The computer-implemented method comprising: detecting a first interaction between the mobile device and the first location device; determining a travel direction of the first mobile device; and automatically filtering a second interaction between the mobile device and a second location device to prevent an unintended call to a conveyance apparatus in response to the travel direction of the mobile device.

In addition to one or more of the features described above, or as an alternative, further embodiments may include that the travel direction of the mobile device is determined in response to the first interaction and a location of the first location device.

In addition to one or more of the features described above, or as an alternative, further embodiments may include that the travel direction of the mobile device is determined in response to a period of time between the first interaction and a previous interaction between the mobile device and a location device, the previous interaction being detected immediately prior to the first interaction.

In addition to one or more of the features described above, or as an alternative, further embodiments may include that the travel direction of the mobile device is determined in response to the first interaction and an acceleration of the mobile device.

In addition to one or more of the features described above, or as an alternative, further embodiments may include that the travel direction of the mobile device is determined in response to the first interaction and an intermediate interaction between the mobile device and a location device, the intermediate interaction being detected between the first interaction and the second interaction.

In addition to one or more of the features described above, or as an alternative, further embodiments may include that the automatically filtering includes blocking the second interaction and any subsequent interaction between the mobile device and a location device for until at least one of a selected period of time has expired, the mobile device has reached a selected geographical location, and a selected interaction is detected between the mobile device and a selected location device.

In addition to one or more of the features described above, or as an alternative, further embodiments may include that the automatically filtering includes blocking the second interaction and any subsequent interaction between the mobile device and a location device that may execute a call for the conveyance apparatus to retrieve a passenger and carry the passenger in a direction opposite the determined travel direction of the mobile device.

In addition to one or more of the features described above, or as an alternative, further embodiments may include that the automatically filtering includes blocking the second interaction and any subsequent interaction between the mobile device and a location device until an input selection is received from a user of the mobile device through an application installed on the mobile device.

In addition to one or more of the features described above, or as an alternative, further embodiments may include that the conveyance system is an elevator system and the conveyance apparatus is an elevator car.

In addition to one or more of the features described above, or as an alternative, further embodiments may include that the first location device of the second location device is located in at least one of a first elevator lobby providing access to the elevator car, the elevator car, and an elevator fixture.

According to another embodiment, a mobile device comprising a memory and a processor is provide. The memory storing program instructions for preventing an unintended call for a conveyance apparatus of a conveyance system thereon. The conveyance system comprising a first location device and a second location device. The program instructions executable by the processor to cause: detecting an first interaction between the mobile device and the first location device; determining a travel direction of the first mobile device; and automatically filtering, by the mobile device, a second interaction between the mobile device and a second location device to prevent an unintended call to a conveyance apparatus in response to the travel direction of the mobile device.

In addition to one or more of the features described above, or as an alternative, further embodiments may include that the travel direction of the mobile device is determined in response to the first interaction and a location of the first location device.

In addition to one or more of the features described above, or as an alternative, further embodiments may include that the travel direction of the mobile device is determined in response to a period of time between the first interaction and a previous interaction between the mobile device and a location device, the previous interaction being detected immediately prior to the first interaction.

In addition to one or more of the features described above, or as an alternative, further embodiments may include that the travel direction of the mobile device is determined in response to the first interaction and an acceleration of the mobile device.

In addition to one or more of the features described above, or as an alternative, further embodiments may include that the travel direction of the mobile device is determined in response to the first interaction and an intermediate interaction between the mobile device and a location device, the intermediate interaction being detected between the first triggering signal and the second interaction.

In addition to one or more of the features described above, or as an alternative, further embodiments may include that the automatically filtering includes blocking the second interaction and any subsequent interaction between the mobile device and a location device for until at least one of a selected period of time has expired, the mobile device has reached a selected geographical location, and a selected interaction is detected between the mobile device and a selected location device.

In addition to one or more of the features described above, or as an alternative, further embodiments may include that the automatically filtering includes blocking the second interaction and any subsequent interaction between the mobile device and a location device that may execute a call for the conveyance apparatus to retrieve a passenger and carry the passenger in a direction opposite the determined travel direction of the mobile device.

In addition to one or more of the features described above, or as an alternative, further embodiments may include that the automatically filtering includes blocking the second interaction and any subsequent interaction between the mobile device and a location device until an input selection is received from a user of the mobile device through an application installed on the mobile device.

In addition to one or more of the features described above, or as an alternative, further embodiments may include that the conveyance system is an elevator system and the conveyance apparatus is an elevator car.

In addition to one or more of the features described above, or as an alternative, further embodiments may include that the first location device of the second location device is located in at least one of a first elevator lobby providing access to the elevator car, the elevator car, and an elevator fixture.

The technical effects and benefits of the hands-free mechanism described herein include automatic calls of any elevator system, along with a hands-free user interface, for navigation in a high rise building with respect to any elevator trip, including multi-segment trips. The technical effects and benefits of the hands-free mechanism described herein also include preventing unnecessary and unintended automatic calls of any elevator system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

In accordance with one or more embodiments, a hands-free mechanism provides passengers an ability to get from any source floor to any destination floor based on sequential interactions between two or more location devices and a mobile device. For instance, the hands-free mechanism operates to determine and execute an elevator call based on an initial interaction of the mobile device with a first of the two or more location devices and a subsequent interaction of the mobile device with a second of the two or more location devices. The hands-free mechanism also filters out/blocks unintended elevators calls to prevent confusion in the elevator system 100.

Figure 1:
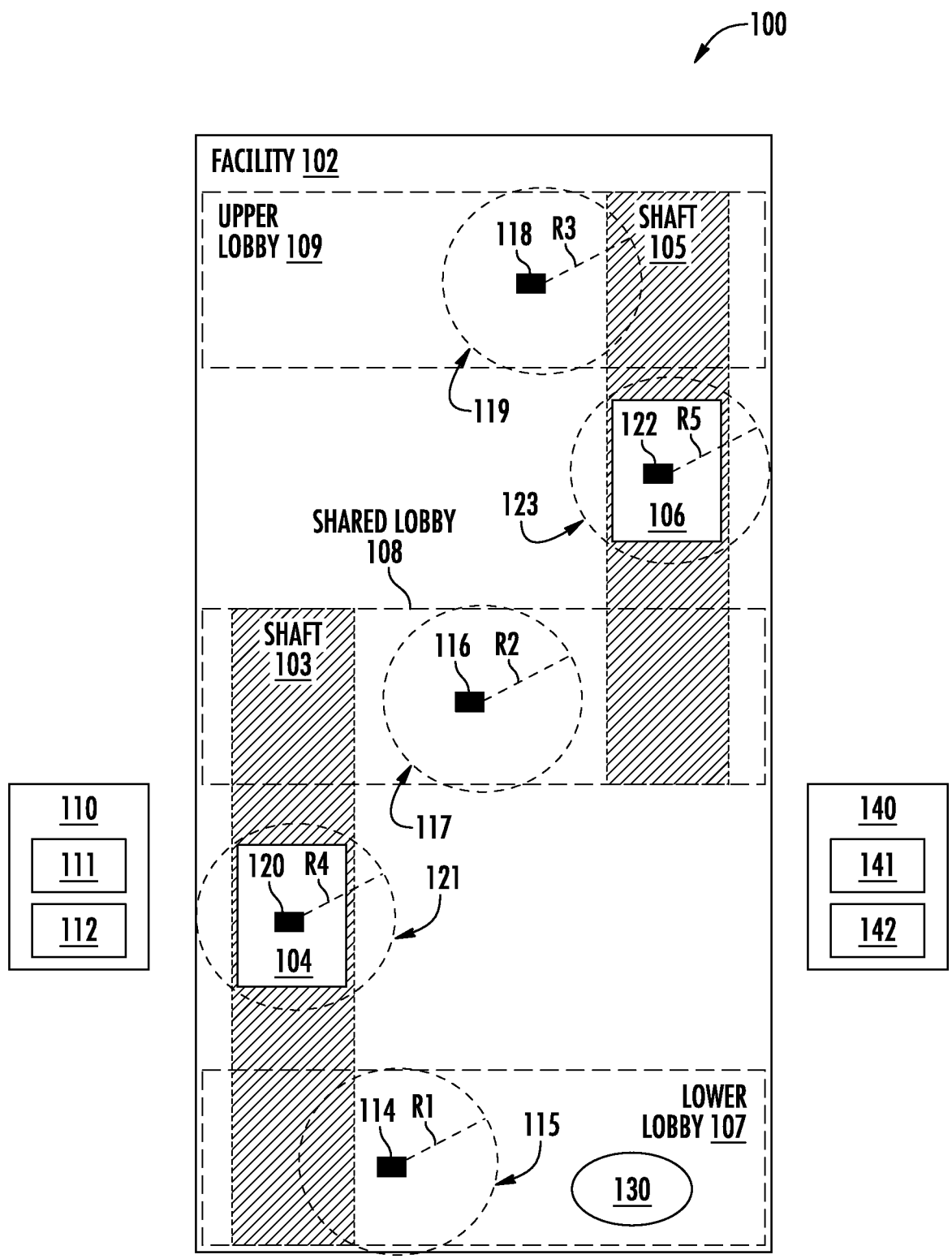
FIG. 1 depicts an environment for a sequence triggering of a call for an elevator car of an elevator system according to one or more embodiments of the present disclosure.

FIG. 1 depicts an environment for a sequence triggering of a call for an elevator car of an elevator system 100 according to one or more embodiments. The environment of FIG. 1 may also be used to prevent unintentional sequence triggering of a call for an elevator car of the elevator system 100. It is understood that while an elevator system 100 is utilized for exemplary illustration, embodiments disclosed herein may be applied to other conveyance systems utilizing conveyance apparatuses for transportation such as, for example, escalators, car taxi/ride sharing systems, etc. The environment can include a facility 102 (e.g., a high rise building) comprising at least one elevator shaft supporting at least one elevator car. As shown in FIG. 1, the facility 102 includes an elevator shaft 103 supporting an elevator car 104 and an elevator shaft 105 supporting an elevator car 106. Note that the elevator car 104 can be accessed at least at a lower lobby 107 (e.g., a ground floor of the facility 102) and a shared lobby 108 (e.g., a middle floor of the facility 102). Further, note that the elevator car 106 can be accessed at least at the shared lobby 108 and an upper lobby 109 (e.g., a top floor of the facility 102). In this regard, the shaft 103 only permits the elevator car 104 to travel between a lower floor and a middle floor (which can be considered an initial segment), and the shaft 105 only permits the elevator car 106 to travel between the middle floor and a top floor (which can be considered a subsequent segment). The arrangement of elevator shafts 103 and 105 is for exemplary purposes only and any desired arrangement and number of elevator shafts and elevator cars may be used. In one embodiment, elevator cars 104 and 106 may be able to serve and stop at any desired floors.

The environment of FIG. 1 comprises a computer 110. The computer 110 comprises a processor 111 and a memory 112. The memory 112 stores program instructions that are executable by the processor 111 to cause the operation described herein. The computer 110 can support and/or be a part of an elevator system 100 that operates the elevator cars 104 and 105. The elevator system 100 comprises one or more location devices.

In accordance with one or more embodiments, the one or more location devices can comprise at least a location device 114 with a location zone 115 (extending a radius R1), a location device 116 with a location zone 117 (extending a radius R2), a location device 118 with a location zone 119 (extending a radius R3), a location device 120 with a location zone 121 (extending a radius R4), and a location device 122 with a location zone 123 (extending a radius R5). The location device 114 can be located within and correspond thereto the lower lobby 107. The location device 116 can be located within and correspond thereto the shared lobby 108. The location device 118 can be located within and correspond thereto the upper lobby 109. The location device 120 can be located within and correspond thereto the elevator car 104. The location device 122 can be located within and correspond thereto the elevator car 106. Note that each radius R1, R2, R3, R4, R5 of each location zone 115, 117, 119, 121, 123 can be predetermined and configured within the elevator system 100, such as at a distance of a width of a lobby or an elevator car. The elevator system 100 interacts with a mobile device (e.g., the mobile device 130) to provide a hands-free user interface for generating elevator calls. Moreover, any location zone and location device may be placed as desired within the environment of FIG. 1 and the elevator system 100, such as in an elevator fixture. In one embodiment, the location zone may be rectangular, planar, 3-dimensional, or any other desired shape and/or size.

The environment of FIG. 1 and the elevator system 100 described herein is an example and is not intended to suggest any limitation as to the scope of use or operability of embodiments described herein (indeed additional or alternative components and/or implementations may be used). Further, while single items are illustrated for items of the environment of FIG. 1, these representations are not intended to be limiting and thus, any item may represent a plurality of items. Embodiments of the environment of FIG. 1 and the elevator system 100 can include configurations for a mobile device centric system (e.g., when one or more location devices is advertising a trigger signal and the mobile device 130 detects trigger signals from the one or more location devices), a location device centric system (e.g., when the mobile device 130 is advertising a trigger signal and the one or more location devices detects trigger signals from the mobile device 130), or a combination thereof. Further, embodiments of the environment of FIG. 1 and the elevator system 100 can include configurations for a lobby focused system, an elevator focused system, or a combination thereof.

The environment of FIG. 1 and the elevator system 100 can satisfy single-segment elevator trips and multi-segment elevator trips. In accordance with one or more embodiments, if multiple event triggers are placed on a same floor, the environment of FIG. 1 and the elevator system 100 can detect a sequence of these multiple event triggers to automatically place a single-segment trip. Further, the environment of FIG. 1 and the elevator system 100 can determine how many elevator trip segments are required for the multi-segment trip and what guidance should be provided to a user during the multi-segment trip. Additionally, the environment of FIG. 1 and the elevator system 100 can detect a sequence of these multiple event triggers to automatically ignore the placement of a single-segment trip or multi-segment trip.

The computer 110 can include any processing hardware, software, or combination of hardware and software utilized by the elevator system 100 to carry out computer readable program instructions by performing arithmetical, logical, and/or input/output operations. The computer 110 can be implemented local to the facility 102, remote to the facility 102, or as a cloud service. The computer 110 can be representative of a plurality of computers dispersed throughout the environment of FIG. 1 and the elevator system 100. The processor 111 can comprise one or more central processing units (CPU(s)), also referred to as processing circuits, coupled via a system bus to the memory 112 and various other internal or external components (e.g., the location devices 114, 116, 118, 120, and 122). The memory 112 can include a read only memory (ROM) and a random access memory (RAM). The computer 110, by utilizing the processor 111 and the memory 112, operates to provide/support automatic calls of the elevator system 100 for navigation in the facility 102 with respect to any elevator trip. The computer 110, by utilizing the processor 111 and the memory 112, operates to support the hands-free user interface of the mobile device 130 for navigation in the facility 102 with respect to any elevator trip. The computer 110, by utilizing the processor 111 and the memory 112, can operate to communicate with the location devices 114, 116, 118, 120, and 122. The computer 110 can also determine a status of each elevator car 104 and 106, such as which floor an elevator car is located, which direction an elevator car is traveling, a number of stops designated for an elevator trip, an elevator door position, an elevator door operation (opening vs. closing), etc. The computer 110 can operate one or more timers (e.g., movement timers and disconnect timers) with respect to the operations described herein.

The location devices 114, 116, 118, 120, and 122 can be an electro-mechanical component that generates the corresponding location zones 115, 117, 119, 121, and 123. Examples of the location devices 114, 116, 118, 120, and 122 include radio devices, such as Wi-Fi devices, Bluetooth devices, wireless beacon devices, etc. The location devices 114, 116, 118, 120, and 122 can utilize software and/or firmware to carry out operations particular thereto. In this regard, the location devices 114, 116, 118, 120, and 122 can be configured to provide triggering signals (e.g., one-way communication devices advertising a location; a radio signal being broadcast to the mobile device 130). For example, the location devices 114, 116, 118, 120, and 122 themselves can provide a triggering signal to the mobile device that causes the mobile device 130 to place an elevator call, e.g., if the mobile device receives a correct event trigger sequence, with is a set of ordered interactions between the mobile device 130 and the location devices 114, 116, 118, 120, and 122.

The location devices 114, 116, 118, 120, and 122 can include transceivers (e.g., communications and/or interface adapter) that can communicate with the computer 110 and/or the mobile device 130. The location devices 114, 116, 118, 120, and 122 may communicate with the computer 110 with wires or wirelessly. In this regard, the location devices 114, 116, 118, 120, and 122 can be configured to detect the mobile device 130 (e.g., continuously sensing the mobile device 130; the mobile device 130 altering a field of the corresponding location zone) and/or communicate with the mobile device 130 with respect to the corresponding location zones 115, 117, 119, 121, and 123. For example, the location devices 114, 116, 118, 120, and 122 themselves can automatically cause the execution of an elevator call based on one or more event trigger sequences respective to interactions with the mobile device 130. Further, the location devices 114, 116, 118, 120, and 122 can generate one or more electrical signals to the computer 110 as a function of the mobile device detection (e.g., generates an electrical signal in response to detecting a presence of the mobile device 130) and/or the mobile device communication.

The mobile device 130 can include any processing hardware, software, or combination of hardware and software utilized to carry out computer readable program instructions by performing arithmetical, logical, and/or input/output operations. The mobile device 130 can include any wireless device operated by a passenger, such as a laptop, a table computer, a mobile phone, a smartphone, a wireless beacon on the user (e.g., an electronic bracelet), radio frequency identification card, smartwatches, implants, smart glasses, wearable components, and the like. The mobile device 130 can interact/detect/communicate with the one or more location devices of the elevator system 100, can support/provide/execute an application and a hands-free user interface, and can connect to the computer 110 or a cloud server 140 (wirelessly through an internet, cellular, or cloud connection). The mobile device 130 can also include a Microelectromechanical system (MEMS) sensor configured to detected accelerations of the mobile device 130. The MEMS sensor may be a sensor such as, for example, an accelerometer, a gyroscope, or a similar sensor known to one of skill in the art.

The cloud server 140, comprising a processor 141 and a memory 142 as described herein, can include any processing hardware, software, or combination of hardware and software in communication with the mobile device 130 to carry out computer readable program instructions by performing arithmetical, logical, and/or input/output operations. The cloud server 140 can be implemented local to the facility 102, remote to the facility 102, or as a cloud service to the mobile device 130. The cloud server 140, by utilizing the processor 141 and the memory 142, operates to support automatic calls executed by the mobile device 130.

In accordance with one or more embodiments, the mobile device 130 executes and/or prevents execution of elevator calls in response to one or more event trigger sequences based on a logic in the application (to interpret a correct sequence). The application allows the mobile device 130 to send messages via cellular towers or other communication means (provide information over the internet to cloud-based internet servers, such as the cloud server 140 or locally through location devices using short range wireless communication, such as, for example, Bluetooth). The cloud server 140 can in turn send elevator requests to the elevator controllers (e.g., the computer 110) in a specific building (e.g., the facility 102). Thus, the mobile device 130 detecting a trigger at one of the lobbies 107, 108, and 109 or within the elevator car 104 or 106 is able to send a message through a cellular network that eventually is received by the elevator system 100. Further, the logic in the application can store default, preset, and/or manual entries of floor destinations with respect to a user profile within the application and can cause the execution of elevator calls based on these entries as the mobile device 130 interacts with the environment of FIG. 1 and the elevator system 100. In accordance with one or more embodiments, the mobile device 130 outputs a unique signal identifying the mobile device 130 to the location devices 114, 116, 118, 120, and 122 to provide one or more event trigger sequences to the environment of FIG. 1 and the elevator system 100. An event trigger sequence is a set of ordered interactions between the mobile device and the location devices 114, 116, 118, 120, and 122. The elevator system 100 can also operate automatic calls based on sequential detections of the mobile device 130 (e.g., an event trigger sequence). In this regard, the elevator system 100 can execute each segment request internally, while a user is continuously notified of each elevator assignment without user confirmation (e.g., hands-free operation).

In accordance with one or more embodiments, the environment of FIG. 1 and the elevator system 100 herein can be applied to non-smartphone type systems where a passenger's identity is automatically detected via biometric scans, facial recognition, computer chip embedded within an ID (e.g. RFID Chip) or other means (the same resulting multi-segment trip call could be executed). Advantageously, using a non-smartphone type system would allow a person to be tracked and elevator calls processed and/or canceled, whether or not they are in possession of their smartphone. For example, if a video analytics system is in-place at each floor, a process flow can be executed where if a user is detected on the lower lobby 107 and then the user is detected in elevator 104, then an elevator call for the elevator 106 is automatically placed for the user at shared lobby 108.

Figure 2:
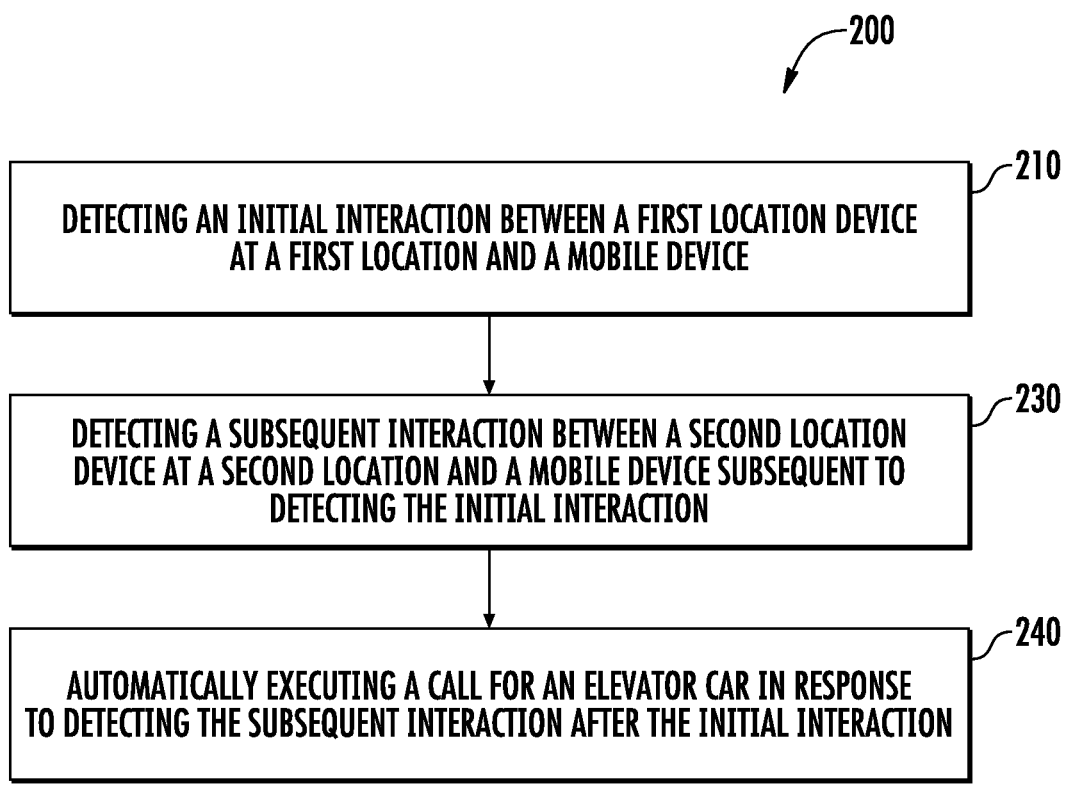
FIG. 2 depicts a process flow of an elevator system according to one or more embodiments of the present disclosure.

Turning now to FIG. 2, a process flow 200 of the elevator system 100 is depicted according to one or more embodiments. The process flow 200 is an example operation to determine and execute an elevator call based on an initial interaction of the mobile device 130 with a first of the two or more location devices and a subsequent interaction of the mobile device 130 with a second of the two or more location devices (e.g., an event trigger sequence). Note that any combination of at least two location devices of the elevator system 100 can be utilized to construct an event trigger sequence to implement the process flow 200.

For instance, the process flow 200 can utilize the following location device combinations in a lobby focused system to the construct the event trigger sequences of (1L) a location device 114 interaction followed by a location device 116 interaction and (2L) a location device 118 interaction followed by a location device 116 interaction.

Further, the process flow 200 can utilize the following location device combinations in an elevator focused system to the construct the event trigger sequences of (1E) a location device 120 interaction followed by a location device 122 interaction and (2E) a location device 122 interaction followed by a location device 120 interaction.

Furthermore, the process flow 200 can utilize the following location device combinations in a joint lobby-elevator system to the construct the event trigger sequences of (1C) a location device 114 interaction followed by a location device 120 interaction, (2C) a location device 116 interaction followed by a location device 122 interaction, (3C) a location device 118 interaction followed by a location device 122 interaction, and (4C) a location device 116 interaction followed by a location device 120 interaction, along with utilizing the combinations (1L), (2L), (1E), and (2E) described herein. Note that any three or more interaction combination are also configurable.

For ease of explanation, the process flow 200 is now described with respect to a lobby focused system where the first and second location devices respectively align with the event trigger sequences of (1L) the location device 114 interaction followed by the location device 116 interaction.

The process flow 200 begins at block 210, with a detection of an initial interaction between a first location device at a first location and a mobile device. In accordance with one or more embodiments, the first location device can be the location device 114, and the first location can be the lower lobby 107. In a mobile device centric system, the initial interaction can include the mobile device 130 detecting a one-way triggering signal by the location device 114, which the mobile device 130 determines as a first event in the event trigger sequence. In a location device centric system, the initial interaction can alternatively be the location device 114 detecting the mobile device 130, which is determined by the location device 114 or the computer 110 as the first element in an event trigger sequence.

At block 230, a detection of a subsequent interaction between a second location device at a second location and a mobile device occurs. In accordance with one or more embodiments, the second location device can be the location device 116, and the second location can be the shared lobby 108. In the mobile device centric system, the subsequent interaction can include the mobile device 130 detecting a one-way triggering signal by the location device 116, which the mobile device 130 determines as a second event in the event trigger sequence. In the location device centric system, the subsequent interaction can alternatively be the location device 116 detecting the mobile device 130, which is determined by the location device 116 or the computer 110 as the second element in an event trigger sequence.

At block 240, the elevator system 100 automatically executes a call for an elevator car in response to detecting the subsequent interaction after the initial interaction. For example, in the mobile device centric system, the mobile device 130 can communicate to the computer 110 to execute a call for the elevator 106 to retrieve a passenger operating the mobile device 130 in the shared lobby 108. In the location device centric system, after the computer 110 receives triggering events from the location device 114 and the location device 116 in order, the computer 110 can execute a call for the elevator 106 to retrieve a passenger operating the mobile device 130 in the shared lobby 108.

Figure 3:
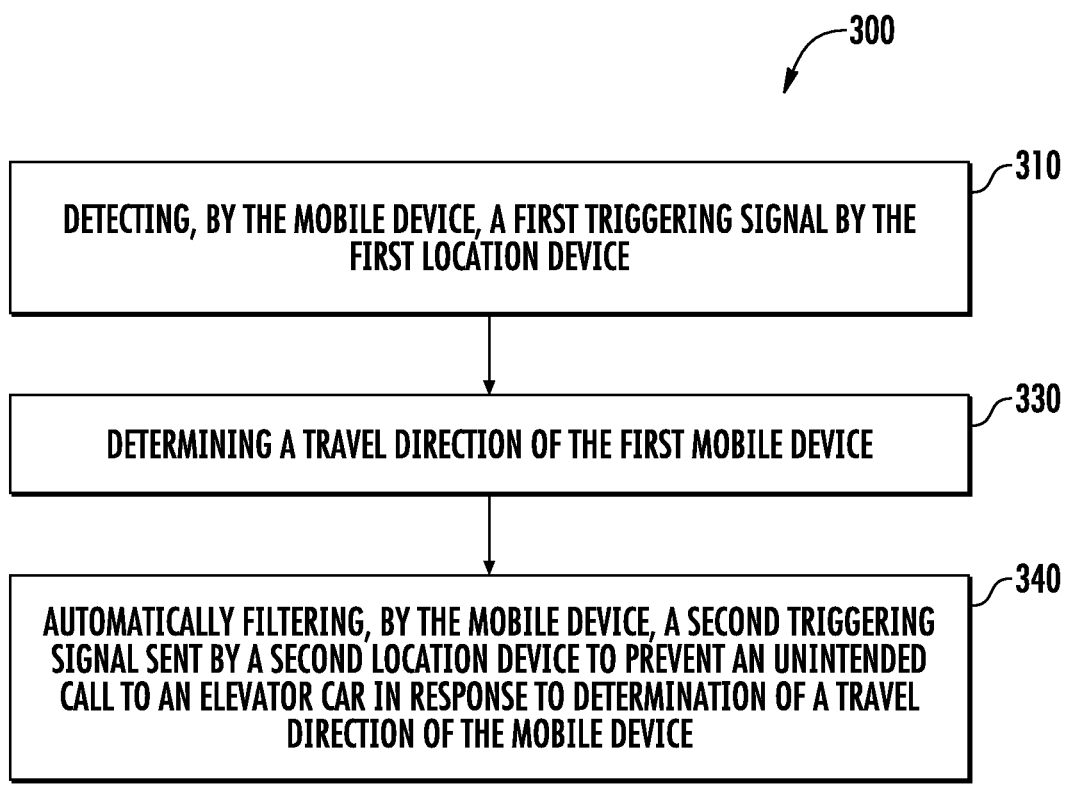
FIG. 3 depicts a process flow of an elevator system according to one or more embodiments of the present disclosure.

Turning now to FIG. 3 with continued reference to FIGS. 1-2, a process flow 300 of the elevator system 100 is depicted according to one or more embodiments. The process flow 300 is an example operation to determine and prevent an unintended elevator call based on an initial interaction of the mobile device 130 with a first location device and a determination of a travel direction of the mobile device 130.

For ease of explanation, the process flow 300 is now described with respect to a lobby focused system where the first and second location devices respectively align with the event trigger sequences of (1L) the location device 118 interaction followed by the location device 116 interaction.

The process flow 300 begins at block 310, with a detection of an initial interaction between a first location device at a first location and a mobile device 130. In accordance with one or more embodiments, the first location device can be the location device 118, and the first location can be the upper lobby 109. In a mobile device centric system, the initial interaction can include the mobile device 130 detecting a one-way triggering signal by the location device 118, which the mobile device 130 determines as a first event in the event trigger sequence. In a location device centric system, the initial interaction can alternatively be the location device 118 detecting the mobile device 130, which is determined by the location device 118 or the computer 110 as the first element in an event trigger sequence.

At block 330, a travel direction of the mobile device 130 is determined. The determination of a travel direction of the mobile device 130 may be determined using multiple methods, as described below.

The determination of a travel direction of the mobile device 130 may be determined in response to the initial interaction of the mobile device 130 with the first location device and a location of the first location device. For instance, if the mobile device 130 interacts with the location device 118 on the upper lobby 109 it may indicate that the mobile device is approaching the elevator shaft 105 with the intention of traveling downward, thus the travel direction of the mobile device 130 would be downward.

The determination of a travel direction of the mobile device 130 may be determined in response to a period of time between the initial interaction of the mobile device 130 with the first location device and the previous interaction that the mobile device 130 had with any location device immediately prior to the initial interaction. If the initial interaction of the mobile device 130 with the first location device occurs more than a selected time period after the mobile device 130 has interacted with any other location device, it may indicate that the mobile device 130 intends to travel in a specific direction. For instance, if the mobile device 130 interacts with the location device 118 on the upper lobby 109 more than eight hours after interacting with any other location device then it may indicate that the mobile device 130 is approaching the elevator shaft 105 with the intention of traveling downward, thus the travel direction of the mobile device 130 would be downward.

The determination of a travel direction of the mobile device 130 may be determined in response to the initial interaction of the mobile device 130 with the first location device and a subsequent acceleration detected by the mobile device 130 within a selected time period of the initial interaction. For example, if the mobile device 130 interacts with the location device 118 on the upper lobby 109 proximate the elevator shaft 105 for an initial interaction and a downward acceleration is detected within a selected time period of the initial interaction then it may indicate that the mobile device 130 is traveling downward in elevator car 106, thus the travel direction of the mobile device 130 would be downward. As described above, the mobile device 130 may detect acceleration using a MEMS sensor.

The determination of a travel direction of the mobile device 130 may also be determined by a subsequent interaction of the mobile device 130 with an intermediate location device of the two or more location devices (e.g., an event trigger sequence). Note that any combination of at least two location devices of the elevator system 100 can be utilized to construct an event trigger sequence to implement the process flow 300. Also note that the intermediate location device may produce an intermediate triggering signal received between the first triggering signal in block 210 below and the second triggering signal in block 240.

For instance, the process flow 300 can utilize the following location device combinations in a lobby focused system to the construct the event trigger sequences of (1L) a location device 118 interaction followed by a location device 116 interaction (i.e. going down) and (2L) a location device 114 interaction followed by a location device 116 interaction (i.e. going up).

Further, the process flow 300 can utilize the following location device combinations in an elevator focused system to the construct the event trigger sequences of (1E) a location device 122 interaction followed by a location device 120 interaction (i.e. going down) and (2E) a location device 120 interaction followed by a location device 122 interaction (i.e. going up).

Furthermore, the process flow 300 can utilize the following location device combinations in a joint lobby-elevator system to the construct the event trigger sequences of (1C) a location device 118 interaction followed by a location device 122 interaction, (2C) a location device 116 interaction followed by a location device 120 interaction, (3C) a location device 114 interaction followed by a location device 120 interaction, and (4C) a location device 116 interaction followed by a location device 122 interaction, along with utilizing the combinations (1L), (2L), (1E), and (2E) described herein. Note that any three or more interaction combinations are also configurable.

At block 340, the elevator system 100 automatically filters a second interaction between the mobile device 130 and a second location device to prevent an unintended call to an elevator car in response to determination of a travel direction of the mobile device 130. The elevator system 100 may proceed to filter subsequent interactions between the mobile device 130 and subsequent location devices following the second interaction. Filtering may include blocking any subsequent interaction between the mobile device 130 and a location device for a selected period of time.

Filtering may include blocking the second interaction and any subsequent interaction between the mobile device 130 and a location device until the mobile device has reached a selected geographical location, such as, for example, outside of the a selected range of the facility 102. Filtering may include selectively blocking the second interaction and any subsequent interaction between the mobile device 130 and a location device that may execute a call for the elevator car 106 to retrieve a passenger and carry the passenger in a direction opposite the determined travel direction of the mobile device 130. Filtering may include blocking the second interaction and any subsequent interaction between the mobile device 130 and a location device until a selected triggering signal is received from a selected location device. The selected location device may have a specific location relative to the facility 102, such as, for example, an exit of the facility 102, a security checkpoint, an entrance to an office, etc. Filtering may include blocking the second interaction and any subsequent interaction between the mobile device 130 and a location device until an input selection is received from a user of the mobile device 130. The input selection may be made by the user of the mobile device 130, through an application installed on the mobile device 130, to turn off the filtering. For instance, a user of the mobile device 130 may make this selection of the elevator system 100 is no longer calling elevator cars when it should as described in method 200.

In the mobile device centric system, the mobile device 130 can filter subsequent interactions between the mobile device and location devices (i.e. triggering signals from the location devices) to prevent an unintended call to an elevator car in response to determination of a travel direction of the mobile device 130. In the location device centric system, after the computer 110 receives triggering events from the location device 114 and the travel direction of the mobile device 130 is determined, the computer 110 can filter subsequent interactions between the mobile device and location devices to prevent an unintended call to an elevator car in response to determination of a travel direction of the mobile device 130.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer-implemented method for preventing an unintended call for a conveyance apparatus of a conveyance system, the conveyance system comprising a first location device and a second location device, the computer-implemented method comprising:

detecting a first interaction between a mobile device and the first location device;

determining a travel direction of the first mobile device;

detecting or anticipating a second interaction between the mobile device and a second location device; and automatically filtering the second interaction between the mobile device and the second location device to prevent an unintended call to a conveyance apparatus in response to the travel direction of the mobile device.

2. The computer-implemented method of claim 1, wherein the travel direction of the mobile device is determined in response to the first interaction and a location of the first location device.

3. The computer-implemented method of claim 1, wherein the travel direction of the mobile device is determined in response to a period of time between the first interaction and a previous interaction between the mobile device and a location device, the previous interaction being detected immediately prior to the first interaction.

4. The computer-implemented method of claim 1, wherein the travel direction of the mobile device is determined in response to the first interaction and an acceleration of the mobile device.

5. The computer-implemented method of claim 1, wherein the travel direction of the mobile device is determined in response to the first interaction and an intermediate interaction between the mobile device and a location device, the intermediate interaction being detected between the first interaction and the second interaction.

6. The computer-implemented method of claim 1, wherein the automatically filtering includes blocking the second interaction and any subsequent interaction between the mobile device and a location device for until at least one of a selected period of time has expired, the mobile device has reached a selected geographical location, and a selected interaction is detected between the mobile device and a selected location device.

7. The computer-implemented method of claim 1, wherein the automatically filtering includes blocking the second interaction and any subsequent interaction between the mobile device and a location device that may execute a call for the conveyance apparatus to retrieve a passenger and carry the passenger in a direction opposite the determined travel direction of the mobile device.

8. The computer-implemented method of claim 1, wherein the automatically filtering includes blocking the second interaction and any subsequent interaction between the mobile device and a location device until an input selection is received from a user of the mobile device through an application installed on the mobile device.

9. The computer-implemented method of claim 1, wherein the conveyance system is an elevator system and the conveyance apparatus is an elevator car.

10. The computer-implemented method of claim 9, wherein the first location device of the second location device is located in at least one of a first elevator lobby providing access to the elevator car, the elevator car, and an elevator fixture.

11. A mobile device comprising a memory and a processor, the memory storing program instructions for preventing an unintended call for a conveyance apparatus of a conveyance system thereon, the conveyance system comprising a first location device and a second location device, the program instructions executable by the processor to cause:
detecting a first interaction between the mobile device and the first location device;
determining a travel direction of a first mobile device;
detecting or anticipating a second interaction between the mobile device and a second location device; and
automatically filtering, by the mobile device, the second interaction between the mobile device and the second location device to prevent an unintended call to a conveyance apparatus in response to the travel direction of the mobile device.

12. The mobile device of claim 11, wherein the travel direction of the mobile device is determined in response to the first interaction and a location of the first location device.

13. The mobile device of claim 11, wherein the travel direction of the mobile device is determined in response to a period of time between the first interaction and a previous interaction between the mobile device and a location device, the previous interaction being detected immediately prior to the first interaction.

14. The mobile device of claim 11, wherein the travel direction of the mobile device is determined in response to the first interaction and an acceleration of the mobile device.

15. The mobile device of claim 11, wherein the travel direction of the mobile device is determined in response to the first interaction and an intermediate interaction between the mobile device and a location device, the intermediate interaction being detected between the first triggering signal and the second interaction.

16. The mobile device of claim 11, wherein the automatically filtering includes blocking the second interaction and any subsequent interaction between the mobile device and a location device for until at least one of a selected period of time has expired, the mobile device has reached a selected geographical location, and a selected interaction is detected between the mobile device and a selected location device.

17. The mobile device of claim 11, wherein the automatically filtering includes blocking the second interaction and any subsequent interaction between the mobile device and a location device that may execute a call for the conveyance apparatus to retrieve a passenger and carry the passenger in a direction opposite the determined travel direction of the mobile device.

18. The mobile device of claim 11, wherein the automatically filtering includes blocking the second interaction and any subsequent interaction between the mobile device and a location device until an input selection is received from a user of the mobile device through an application installed on the mobile device.

19. The mobile device of claim 11, wherein the conveyance system is an elevator system and the conveyance apparatus is an elevator car.

20. The mobile device of claim 19, wherein the first location device of the second location device is located in at least one of a first elevator lobby providing access to the elevator car, the elevator car, and an elevator fixture.

* * * * *